US012316365B2

(12) United States Patent
Morino et al.

(10) Patent No.: US 12,316,365 B2
(45) Date of Patent: May 27, 2025

(54) ELECTRONIC APPARATUS (71) Applicant: LENOVO (SINGAPORE) PTE. LTD., Singapore (SG)

(72) Inventors: Takayuki Morino, Yokohama (JP); Daisuke Takahashi, Yokohama (JP); Masaaki Bandoh, Yokohama (JP); Hiroaki Kinoshita, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 221 days.

(21) Appl. No.: 18/146,444

(22) Filed: Dec. 26, 2022

(65) Prior Publication Data

US 2023/0283313 A1 Sep. 7, 2023

(30) Foreign Application Priority Data

Mar. 2, 2022 (JP) ................ 2022-031791

(51) Int. Cl.
*H04B 1/38* (2015.01)
*H04B 1/3818* (2015.01)
(52) U.S. Cl.
CPC .................. *H04B 1/3818* (2015.01)
(58) Field of Classification Search
CPC .................................................. H04B 1/3818
See application file for complete search history.

(56) References Cited

U.S. PATENT DOCUMENTS

| 2016/0268711 A1* | 9/2016 | Chuang | H01R 13/71 |
| 2017/0324177 A1* | 11/2017 | Lempiainen | H01R 12/73 |
| 2021/0042478 A1 | 2/2021 | Heo et al. | |
| 2021/0144544 A1* | 5/2021 | Kim | H04B 1/3818 |
| 2021/0337382 A1* | 10/2021 | Tokuchi | H04W 12/069 |

FOREIGN PATENT DOCUMENTS

| JP | H04000629 A | 1/1992 |
| JP | 10187289 A | 7/1998 |
| JP | 2000188711 A | 7/2000 |
| JP | 2016031887 A | 3/2016 |

* cited by examiner

*Primary Examiner* — Junpeng Chen
(74) *Attorney, Agent, or Firm* — SHIMOKAJI IP (57) ABSTRACT An electronic apparatus has: a tray holding a communication card; a card socket accommodating the tray; an eject mechanism that ejects the tray in response to an operation of inserting a pin; a cover which is provided integrally with the tray and in which an eject hole through which the pin is inserted to operate the eject mechanism is formed; a reset switch for resetting a system in response to the operation of inserting the pin; and a reset hole into which the pin is inserted to operate the reset switch. The card socket and the reset switch are provided adjacently to a position along a first edge of a flat rectangular chassis, and the reset hole is covered by the cover while the tray is in the card socket.

4 Claims, 7 Drawing Sheets

ELECTRONIC APPARATUS

BACKGROUND OF THE INVENTION

Field of the Invention

The present invention relates to an electronic apparatus provided with a reset switch.

Description of the Related Art

Some electronic apparatuses such as laptop PCs are provided with a reset switch for resetting the system in unexpected situations, such as when a power button stops working (refer to Japanese Unexamined Patent Application Publication No. 10-187289). The main body of the reset switch is provided in a chassis. A reset hole into which a pin is inserted to operate the reset switch is frequently formed in the chassis.

SUMMARY OF THE INVENTION

A reset hole in a laptop PC is frequently provided in an inconspicuous location such as the bottom surface of a chassis from a design point of view and consideration for preventing unintended operations. However, from the design point of view, it is more desirable that the reset hole is invisible. A dedicated cover for covering the reset hole could be provided, but this would increase the number of components. Further, the dedicated cover that covers the reset hole would be significantly small, so that there is a concern that the cover may fall off or be lost.

The present invention has been made in view of the above-described problems, and an object of the invention is to provide an electronic apparatus that can cover a reset hole without increasing the number of components.

To solve the above-described problems and achieve the objects, an electronic apparatus according to an embodiment of the present invention is an electronic apparatus that performs communication by reading subscriber information related to communication from a communication card that records the subscriber information, the electronic apparatus includes: a tray holding the communication card; a card socket accommodating the communication card together with the tray; a cover provided integrally with the tray; a reset switch for resetting a system in response to an operation of inserting a pin; and a reset hole into which a pin can be inserted to operate the reset switch, wherein the card socket and the reset switch may be provided adjacently to a position along a first edge of a flat rectangular chassis, and the reset hole may be covered by the cover while the tray is in the card socket. With this arrangement, the reset hole can be covered without increasing the number of components.

The electronic apparatus may have an eject mechanism provided in the card socket to eject the tray in response to an operation of inserting a pin, and an eject hole into which a pin can be inserted to operate the eject mechanism may be formed in the cover. This allows the tray to be drawn out by inserting the pin with the cover still attached.

The cover may have a lengthy shape forming a part of the first edge, the eject hole may be provided in the vicinity of one end in a longitudinal direction in the cover, and the reset hole may be covered by an extension portion extending further to the other end from a position of connection with the tray in the cover. Thus, the reset hole can be located on the opposite side from the eject hole in the cover, making the reset hole easily distinguishable.

A microphone hole for voice input may be formed in a second edge different from the first edge in the chassis. This allows the reset hole and the microphone hole to be clearly identified.

According to the above-described aspects of the present invention, the reset hole can be covered by a part of the cover, which is preferable in terms of design. The cover also functions to cover the opening of a card slot, so that the number of components does not increase.

DETAILED DESCRIPTION OF THE INVENTION

The following will describe in detail an embodiment of an electronic apparatus according to the present invention with reference to the accompanying drawings. It should be noted that the present invention is not limited by the embodiment.

The following will describe in detail in connection with a preferred embodiment of an electronic apparatus according to the present invention with reference to the accompanying drawings.

Figure 1:
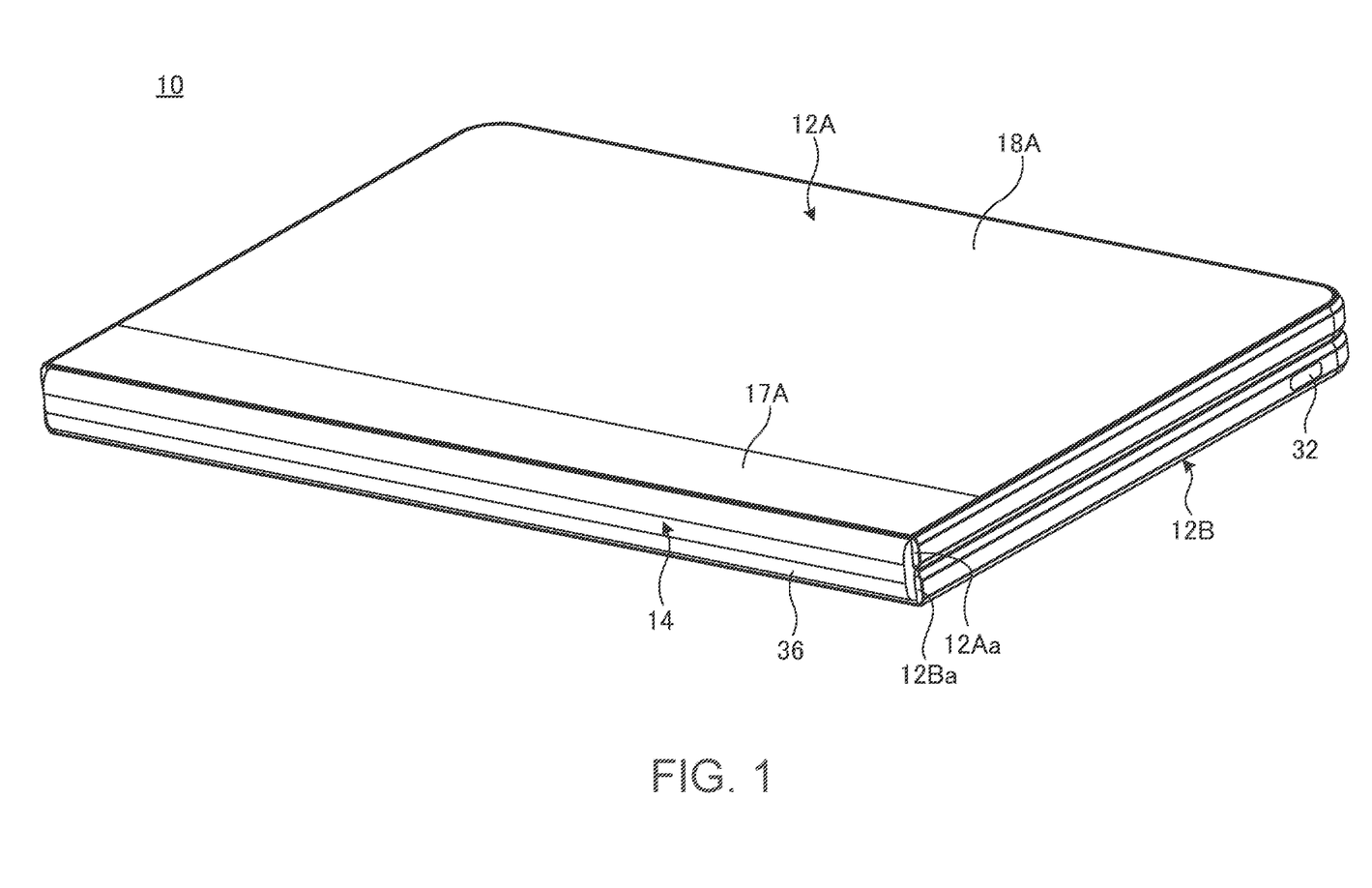
FIG. 1 is a perspective view schematically illustrating an electronic apparatus according to an embodiment closed to be in a 0-degree posture.
Figure 2:
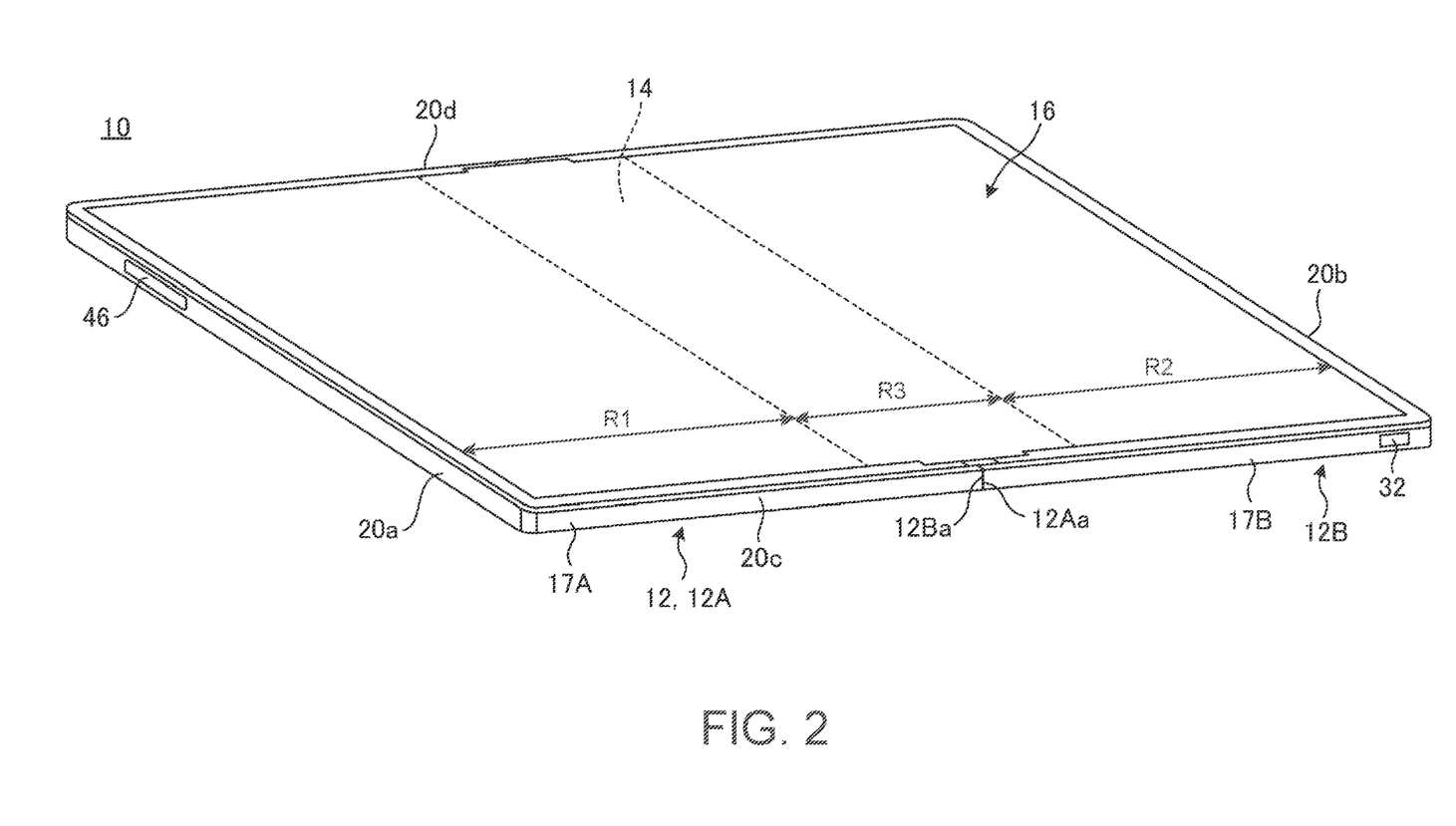
FIG. 2 is a perspective view schematically illustrating the electronic apparatus illustrated in FIG. 1 that has been opened to be in a 180-degree posture.

FIG. 1 is a perspective view schematically illustrating an electronic apparatus 10 according to an embodiment, which has been closed to be in a 0-degree posture. FIG. 2 is a perspective view schematically illustrating the electronic apparatus 10, which is illustrated in FIG. 1 and which has been opened to be in a 180-degree posture.

As illustrated in FIG. 1 and FIG. 2, the electronic apparatus 10 includes a first chassis 12A and a second chassis 12B, a hinge device 14, and a display 16. The electronic apparatus 10 of the present embodiment exemplifies a tablet PC, which is foldable like a book, or a laptop PC. The electronic apparatus 10 may be a smartphone or a portable game machine, or the like.

The chassis 12A and 12B are placed adjacently to each other. The first chassis 12A includes a frame member 17A and a cover member 18A. The frame member 17A is a rectangular frame-shaped member having standing walls formed on three sides other than an adjacent end portion 12Aa adjacent to the second chassis 12B. The cover member 18A is a plate-shaped member that closes the opening of the rear surface of the frame member 17A. Similarly, the second chassis 12B includes a frame member 17B having standing walls formed on three sides other than an adjacent end portion 12Ba adjacent to the first chassis 12A, and a cover member 18B that closes the opening of the rear surface of the frame member 17B. The openings of the front surfaces of the frame members 17A and 17B are closed by the display 16.

The members 17A, 17B, 18A, and 18B are composed of, for example, metal members of stainless steel, magnesium or aluminum, or fiber-reinforced resin plates containing reinforcing fibers such as carbon fiber.

The hinge device 14 connects the chassis 12A and 12B in a relatively rotatable manner between a 0-degree posture and a 180-degree posture. The hinge device 14 functions also as a back cover that hides the gap between the adjacent end portions 12Aa and 12Ba formed in the 0-degree posture illustrated in FIG. 1. The display 16 extends across the chassis 12A and 12B.

In the 0-degree posture illustrated in FIG. 1, the chassis 12A and 12B are folded in half. The display 16 is a paper-like flexible display made of organic EL. In the 0-degree posture, the display 16 is placed such that a region R1 on the first chassis 12A side and a region R2 on the second chassis 12B side illustrated in FIG. 2 are opposed to each other, and a fold region R3, which is a boundary region between the regions R1 and R2, is bent in an arc shape. In the 180-degree posture illustrated in FIG. 2, the chassis 12A and 12B are placed on left and right, side by side with each other. At this time, the display 16 has the regions R1, R2 and the fold region R3 placed side by side on a plane, and forms like a single flat plate as a whole.

Hereinafter, the 0-degree posture is defined as the reference, and for easy understanding, the first chassis 12A and the second chassis 12B will be described as a representative one chassis 12. The electronic apparatus 10 composed of the one chassis 12 can be regarded as a tablet PC in a pseudo manner. Further, the electronic apparatus 10 composed of the one chassis 12 can be also regarded as the main body chassis of a clamshell PC in a pseudo manner if the display 16 is replaced by a physical keyboard.

Figure 3:
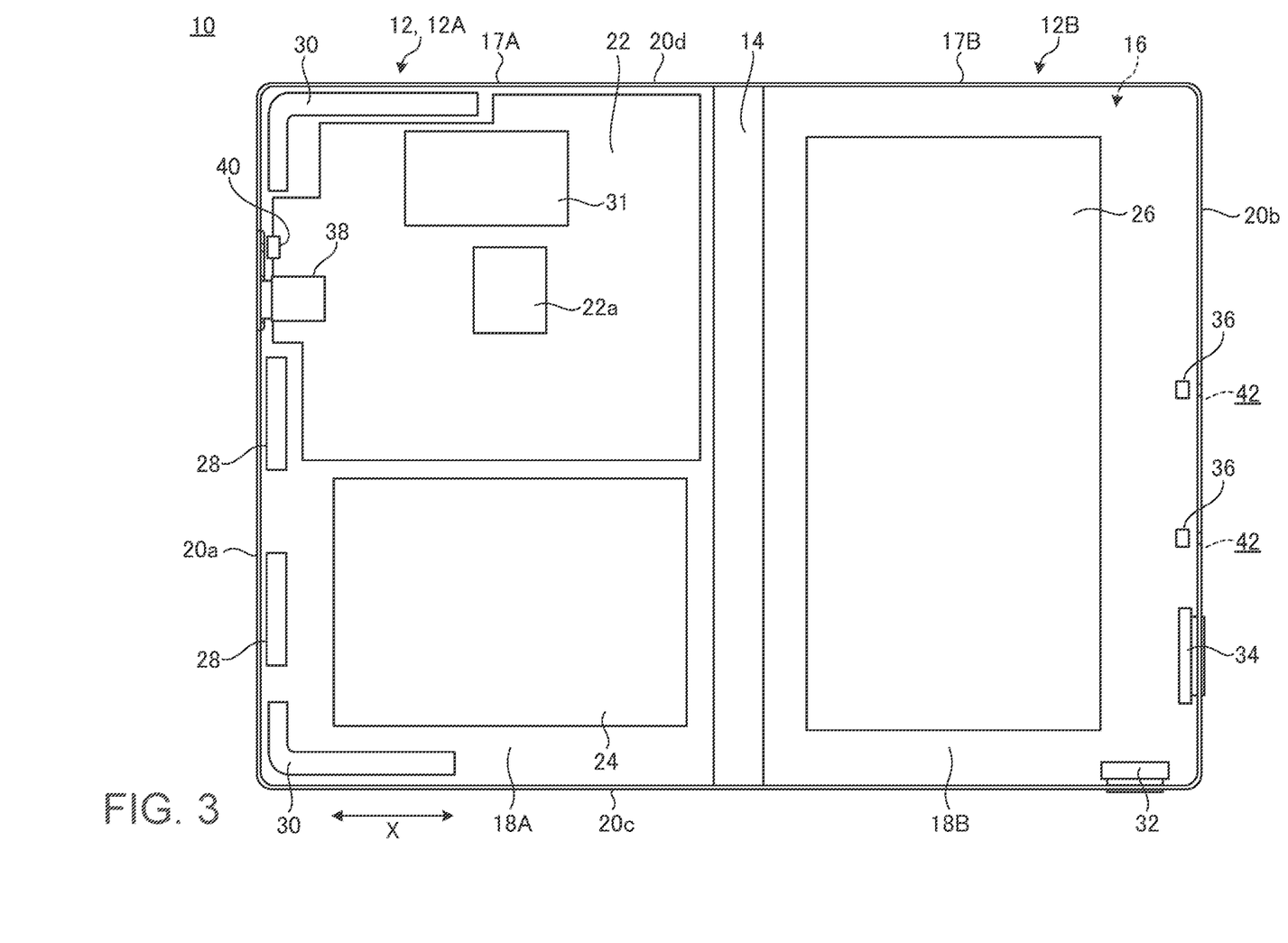
FIG. 3 is a plan view schematically illustrating the internal structure of the electronic apparatus illustrated in FIG. 2.
Figure 4:
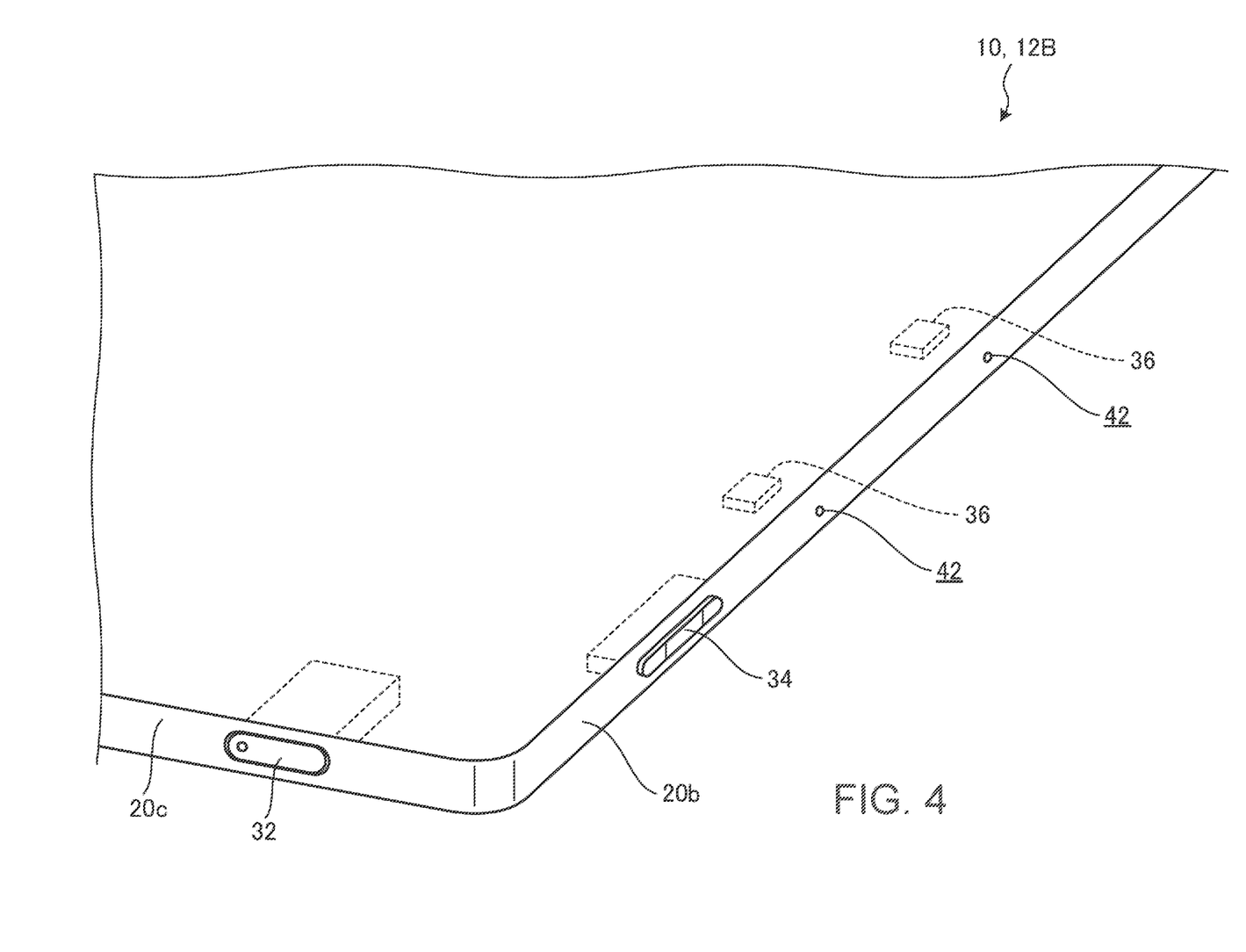
FIG. 4 is an enlarged perspective view of a power button and the surroundings thereof in the electronic apparatus.

FIG. 3 is a plan view schematically illustrating the internal structure of the electronic apparatus 10 illustrated in FIG. 2. FIG. 3 is a diagram of the electronic apparatus 10 viewed from the bottom surface side. FIG. 4 is an enlarged perspective view of a power button 32 and the surroundings thereof in the electronic apparatus 10. The chassis 12 is flat and rectangular, and has a first standing wall 20a, a second standing wall 20b, a third standing wall 20c, and a fourth standing wall 20d along the edges forming the four sides. Herein, the first standing wall 20a will be referred to also as the first edge 20a, and the second standing wall 20b will be referred to also as the second edge 20b. The first standing wall 20a is a part of the frame member 17A, and the second standing wall 20b is a part of the frame member 17B. The first standing wall 20a and the second standing wall 20b are positioned, opposing each other. The third standing wall 20c and the fourth standing wall 20d are formed by the frame member 17A and the frame member 17B. The third standing wall 20c and the fourth standing wall 20d are positioned, opposing each other, and are orthogonal to the first standing wall 20a and the second standing wall 20b.

The chassis 12 of the electronic apparatus 10 incorporates therein various electronic components such as a motherboard 22 with a CPU 22a mounted thereon, a first battery device 24, a second battery device 26, antenna modules 28, speaker modules 30, and a communication module 31. The motherboard 22 and the first battery device 24 occupy most of the area of the first chassis 12A in the chassis 12. The second battery device 26 occupies most of the area of the second chassis 12B in the chassis 12. A pair of the speaker modules 30 are provided for stereo playback. A plurality of the antenna modules 28 are provided according to the mode of communication.

The power button 32, a volume button 34, microphones 36, a card socket 38, and a reset switch 40 are provided along the edge of the chassis 12.

The power button 32 is partly exposed to the outside through a hole provided in a portion of the third standing wall 20c close to the second standing wall 20b, thus allowing the power button 32 to be pushed. The electronic apparatus 10 is turned on by operating the power button 32. The electronic apparatus 10 is turned off automatically by software, or by long-pressing the power button 32. However, the reset switch 40 is used to reset the system in case of unexpected situations.

The volume button 34 is provided along the second edge 20b. The volume button 34 is partly exposed to the outside through a hole provided in a portion of the second standing wall 20b close to the third standing wall 20c, thus allowing the volume button 34 to be pushed. The volume button 34 is, for example, a seesaw type that can be tilted in two directions.

The microphones 36 are provided along the second edge 20b. The microphones 36 are provided in a pair for stereo recording. The pair of the microphones 36 are placed at a substantially central portion of the second edge 20b with a moderate distance provided therebetween. Small microphone holes 42 for voice input are formed at portions of the second standing wall 20b that oppose the pair of the microphones 36. This is to enable the input of voice through the microphones 36 without blocking external sound.

The card socket 38 and the reset switch 40 are provided adjacently at positions along the first edge 20a. The antenna modules 28 and the speaker modules 30 are also partly provided at positions along the first edge 20a, and the card socket 38 and the reset switch 40 are placed within a remaining space.

Figure 5:
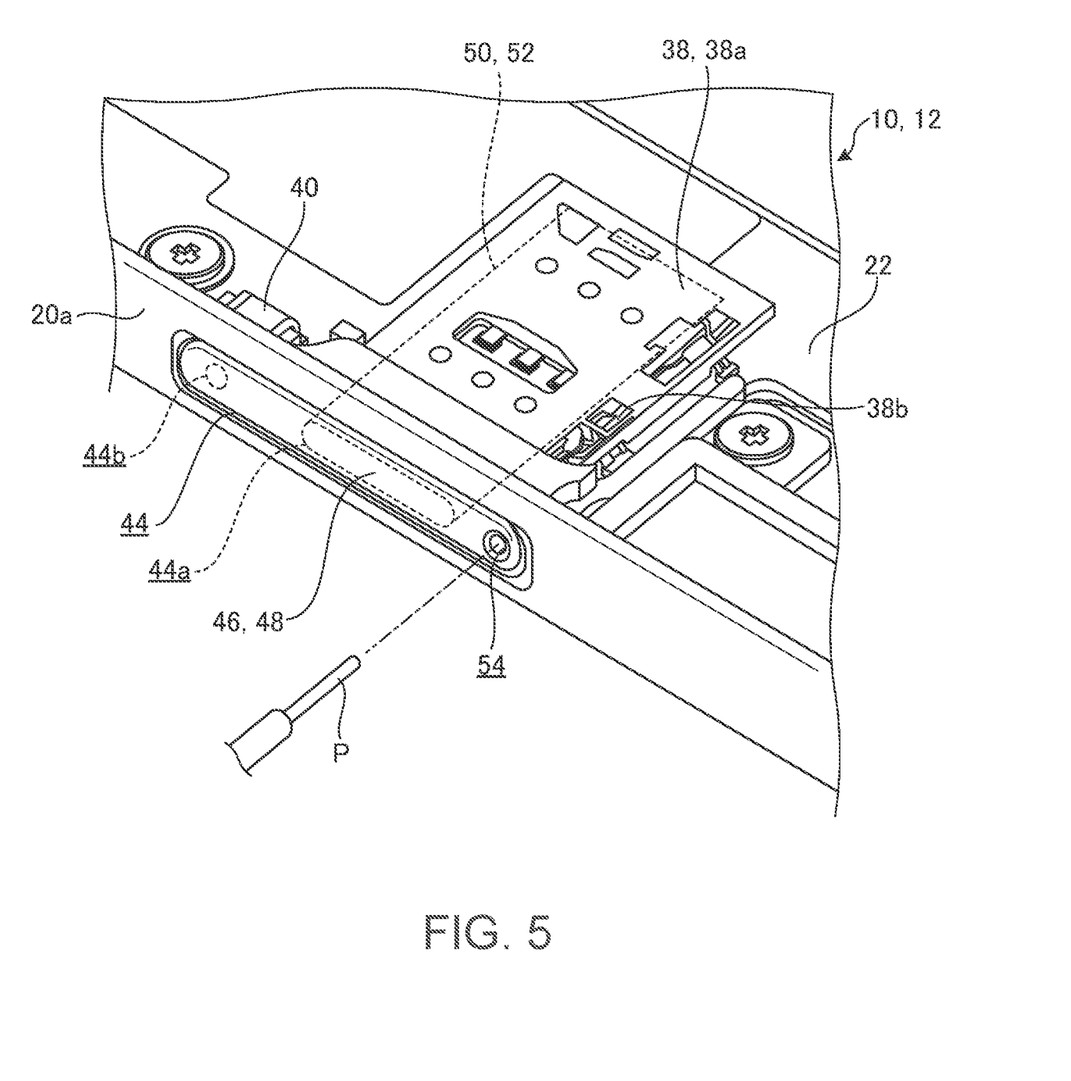
FIG. 5 is a partial enlarged perspective view of a first standing wall.
Figure 6:
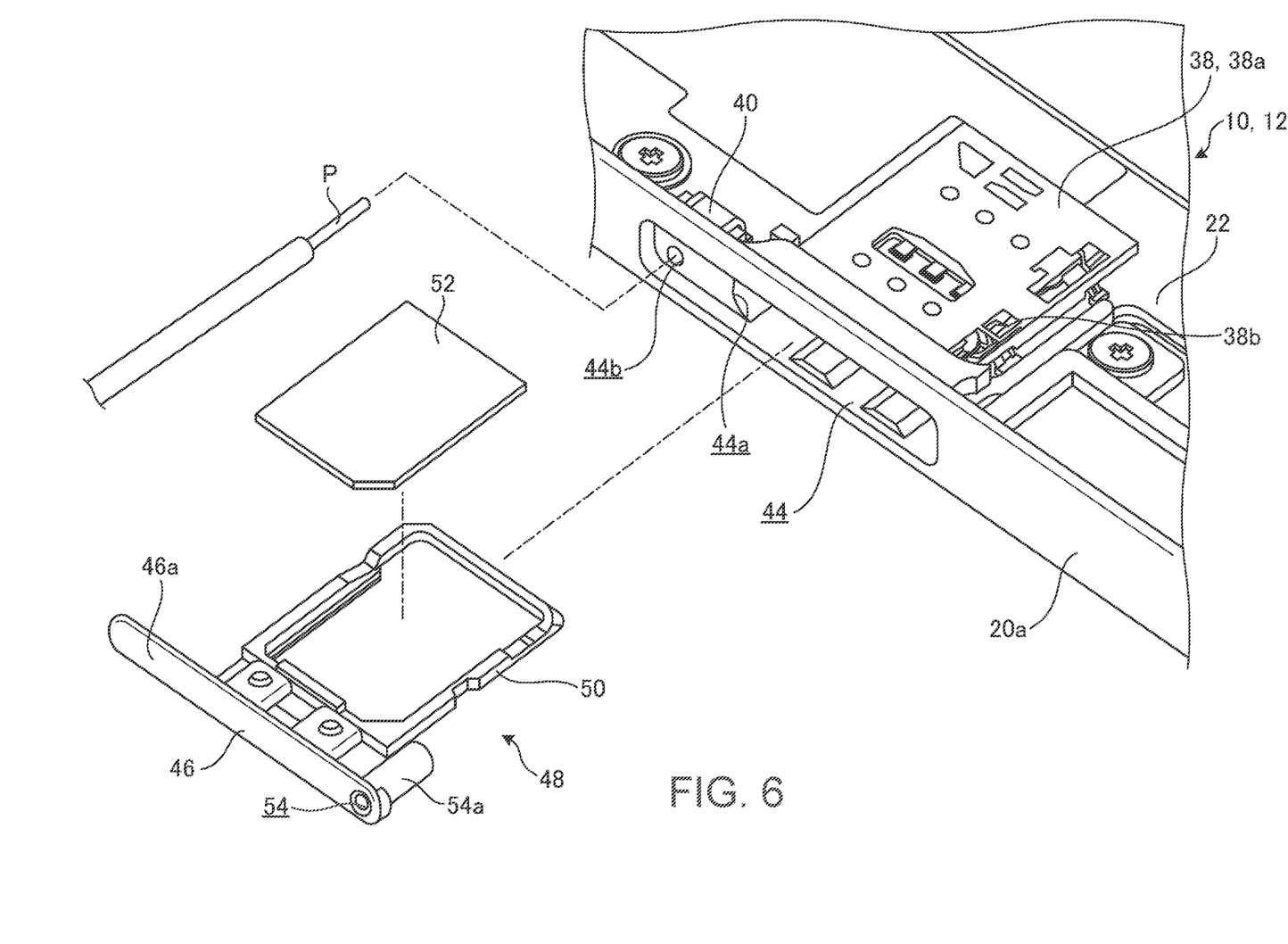
FIG. 6 is a partial enlarged perspective view of the first standing wall with a tray unit removed.
Figure 7:
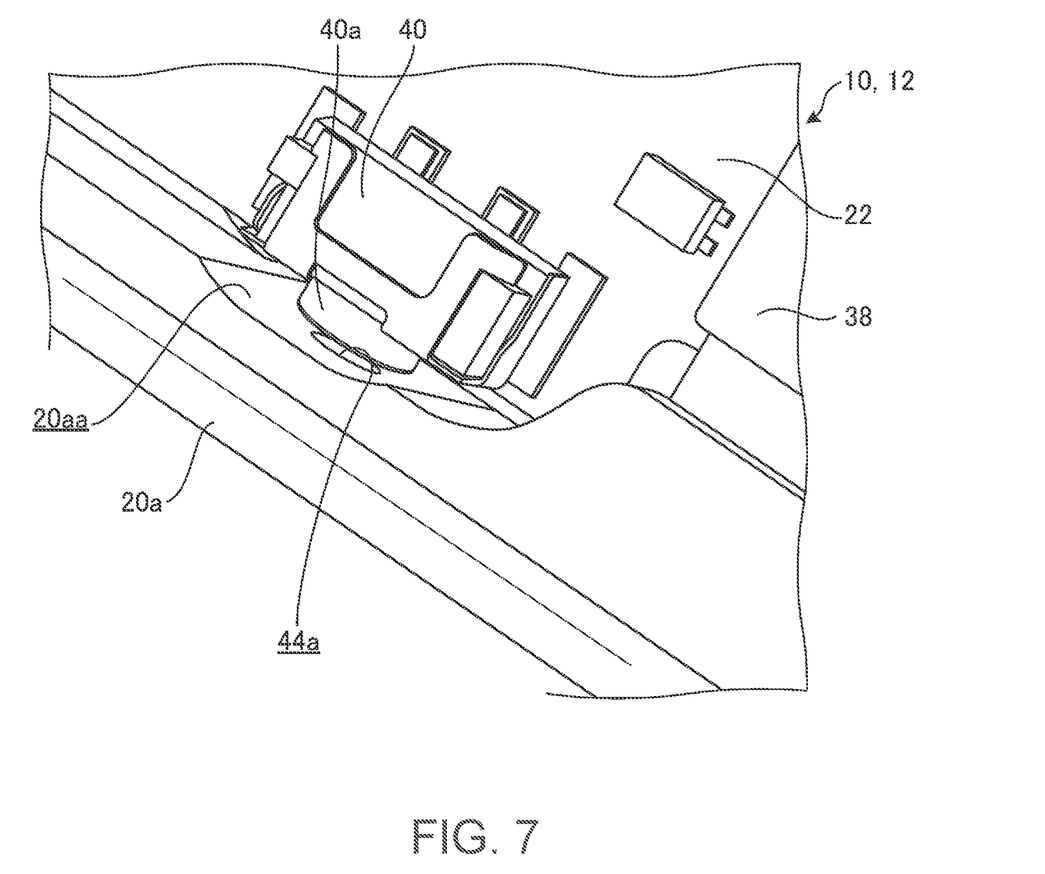
FIG. 7 is a perspective view of a reset switch and the surroundings thereof.

FIG. 5 is a partial enlarged perspective view of the first standing wall 20a. FIG. 6 is a partial enlarged perspective view of the first standing wall 20a with a tray unit 48 removed. FIG. 7 is a perspective view of the reset switch 40 and the surroundings thereof.

The card socket 38 and the reset switch 40 are mounted in an end portion of the motherboard 22, and in the vicinity of the first standing wall 20a. A shallow recess 44 is formed in an area of the first standing wall 20a, the area opposing the card socket 38 and the reset switch 40. The recess 44 is covered by a cover 46. The recess 44 and the cover 46 are semicircular at both ends and elongated along the first standing wall 20a. The cover 46 is on the same plane as the first standing wall 20a and forms a part of the first standing wall 20a in appearance. A horizontally elongated slot 44a and a small reset hole 44b are formed side by side at the bottom of the recess 44.

The cover 46 is a part of the tray unit 48. The tray unit 48 is composed of the cover 46 and the tray 50. The tray 50 is a frame-shaped member holding a communication card 52, and protrudes into the chassis 12 from the cover 46. The communication card 52 is an IC card, in which subscriber information related to communication has been recorded, such as a SIM (Subscriber Identity Module) card. The data recorded in the communication card 52 is, for example, an identification number, a telephone number, a mail address, and the like. In the electronic apparatus 10, the CPU 22a, the communication module 31, or the like reads the subscriber information from the communication card 52 and performs communication on the basis of the information.

A small eject hole 54 is formed in the vicinity of one end (right end in FIG. 6) of the cover 46. A guide tube 54a is provided, which protrudes from the periphery of the eject hole 54 toward the interior of the chassis 12. The tray 50 is provided adjacently to the eject hole 54 and the guide tube 54a. The cover 46 extends further by a predetermined length from the point where the cover 46 is connected to the tray 50 to the other end (left end in FIG. 6). This portion is referred to as an extension portion 46a. The cover 46 is fitted into the recess 44 with almost no gap, with the extension portion 46a covering the reset hole 44b and the remaining portion covering the slot 44a. The reset hole 44b is covered by the extension portion 46a while the tray 50 is in the card socket 38, and is exposed when the tray unit 48 is pulled out.

The card socket 38 is adapted to accommodate the communication card 52 together with the tray 50, and has a main body 38a shaped like a flat box, and an eject mechanism 38b. The main body 38a has an opening that faces the slot 44a, and the tray 50 loaded with the communication card 52 is inserted through the opening. The tray 50 is inserted into the main body 38a and automatically locked by pushing in the cover 46 of the tray unit 48. The contact portions of the communication card 52, which has been inserted in the main body 38a, and the motherboard 22 come in contact with each other, thereby making it possible to read the communication card 52 by the CPU 22a or the like.

The eject mechanism 38b is a mechanism that ejects the tray 50 when a pin P is inserted through the eject hole 54. The tray unit 48 jumps out slightly sideways by the action of the eject mechanism 38b, thus allowing the tray unit 48 to be manually pulled out thereafter. The electronic apparatus 10 of the present embodiment is a so-called hot-swappable type, which allows the communication card 52 to be inserted and removed while the power is on.

The reset switch 40 is adapted to reset the system when the pin P is inserted through the reset hole 44b, and an actuator 40a is provided at a position where the actuator 40a faces the reset hole 44b with a narrow gap therebetween (refer to FIG. 7). The pin P may be the same pin inserted into the eject hole 54. A recess 20aa is formed around the reset hole 44b in the first standing wall 20a. The actuator 40a protrudes slightly into the recess 20aa, and the distance to the outer peripheral surface of the first standing wall 20a is short, thus making it easy to perform the operation using the pin P. The internal contact of the reset switch 40 is changed when the actuator 40a is pressed by the pin P. The reset switch 40 is used to reset the system to cope with unexpected situations such as the power button 32 malfunctioning, for example, to force termination of processing.

As described above, in the electronic apparatus 10 according to the present embodiment, the reset hole 44b is covered by the extension portion 46a of the cover 46, which is preferable in terms of design and prevents accidental operations. The cover 46 functions also to cover the slot 44a, thus preventing an increase of the number of components. The cover 46 is moderately long, covering the reset hole 44b and the slot 44a, and is not a fine component. In addition, the cover 46 is held integrally by the card socket 38 and is not ejected unless the eject mechanism 38b is operated, making it unlikely to fall off or be lost.

The pin P is inserted into the reset hole 44b to perform the resetting while the power of the electronic apparatus 10 is on. To expose the reset hole 44b, the tray 50, which is a part of the tray unit 48, is drawn out together with the cover 46 from the card socket 38. The electronic apparatus 10 enables such an operation, because the hot-swapping of the communication card 52 is possible.

The reset hole 44b in the recess 44 is located on the opposite side from the eject hole 54 in the cover 46, thus making it easy to distinguish. In addition, with the cover 46 removed, the small reset hole 44b is clearly distinguished from the horizontally elongated slot 44a. The reset hole 44b is a small round hole like the microphone holes 42, but is different from the microphone holes 42 in that the reset hole 44b is formed in the first edge 20a different from the second edge 30b, in which the microphone holes 42 are formed, and is usually covered by the cover 46, and unlike the pair of the microphone holes 42, there is only one reset hole 44b, and furthermore, the reset hole 44b is formed in the bottom of the recess 44, thus making clear distinction possible. Thus, an erroneous operation of inserting the pin P into the microphone holes 42 can be prevented. The card socket 38 may not have the eject mechanism 38b, and the tray unit 48 may be a type that is pulled out manually or by other means. In this case, the cover 46 does not need the eject hole 54.

It is needless to say that the present invention is not limited to the above-described embodiment, and modifications can be freely made within a range not departing from the gist of the present invention.

The invention claimed is:

1. An electronic apparatus performing communication by reading subscriber information related to communication from a communication card having the subscriber information recorded therein, comprising:
   a tray that holds the communication card;
   a card socket configured to accommodates therein the communication card together with the tray;
   a cover integral with the tray;
   a reset switch that resets a system in response to insertion of a pin; and
   a reset hole configured to receive the pin,
   wherein the card socket and the reset switch are adjacent to one another along a first edge of a flat rectangular chassis, and
   the reset hole is covered by the cover when the tray is in the card socket.

2. The electronic apparatus according to claim 1, including:
   an eject mechanism in the card socket to eject the tray in response to inserting the pin or another pin,
   wherein an eject hole, into which the pin or another pin can be inserted to operate the eject mechanism, is in the cover.

3. The electronic apparatus according to claim 2, wherein:
   the cover has a longitudinal shape that forms a part of the first edge,
   the eject hole is adjacent to one end of and in the cover, and
   the reset hole is covered by an extension portion of the cover at another end opposite the one end.

4. The electronic apparatus according to claim 1, wherein:
   a microphone hole for voice input is in a second edge in the chassis.

* * * * *